Jan. 28, 1941.  C. F. RAMSEYER  2,229,770
ELECTRIC FURNACE
Filed July 5, 1938  9 Sheets-Sheet 2

INVENTOR
Charles F. Ramseyer
BY
ATTORNEYS

Jan. 28, 1941.     C. F. RAMSEYER      2,229,770
ELECTRIC FURNACE
Filed July 5, 1938      9 Sheets-Sheet 3

INVENTOR
Charles F. Ramseyer
By ATTORNEYS

Jan. 28, 1941.  C. F. RAMSEYER  2,229,770
ELECTRIC FURNACE
Filed July 5, 1938  9 Sheets-Sheet 4

Fig. 8.

INVENTOR
Charles F. Ramseyer
By _____________ ATTORNEYS

Jan. 28, 1941.   C. F. RAMSEYER   2,229,770
ELECTRIC FURNACE
Filed July 5, 1938   9 Sheets-Sheet 7

Fig. 11.

Inventor
Charles F. Ramseyer
By Brown, Jackson, Boettcher & Dienner
Attys.

Jan. 28, 1941.  C. F. RAMSEYER  2,229,770
ELECTRIC FURNACE
Filed July 5, 1938  9 Sheets-Sheet 8

Inventor
Charles F. Ramseyer

Jan. 28, 1941.   C. F. RAMSEYER   2,229,770
ELECTRIC FURNACE
Filed July 5, 1938   9 Sheets-Sheet 9

Inventor
Charles F. Ramseyer
By Barron, Jackson, Buttles & Dienner
Attys.

Patented Jan. 28, 1941

2,229,770

UNITED STATES PATENT OFFICE 2,229,770

ELECTRIC FURNACE

Charles F. Ramseyer, Chicago, Ill.

Application July 5, 1938, Serial No. 217,397

8 Claims. (Cl. 13—23)

This application is a continuation-in-part of my copending application, Serial No. 67,868, filed March 9, 1936.

The object and general nature of this invention is the provision of a new and improved electric furnace especially adapted for use in but not necessarily limited to the production of coal ash slag mineral wool, whereby a product of improved quality and uniformity is secured. By "mineral wool" is ordinarily meant a fine fibrous wool-like material, made by blowing, drawing, spinning, or otherwise subdividing a small falling stream of molten rock or other material, such as metallurgical slag, by any suitable means, so as to form fibers or filaments which solidify upon becoming chilled.

The commercial form of rock wool in considerable use today is commonly made by melting an argillaceous limestone in which the molecular ration of acid oxides (principally silica and alumina) to basic oxides (principally lime and magnesia) is about one to one. The rock is quarried, transported to the plant, melted with coke in a cupola from which the molten stream issues, and is then finally formed by suitable means into rock wool.

Instead of melting rock or the like, sometimes the slags resulting from the smelting of various metallic ores, such as lead and copper, have been found to be suitable for remelting in a cupola and blowing into a mineral wool, the product being usually referred to in this case as "slag wool." Attempts to form the molten slags directly from the smelters without cooling and remelting have commonly been unsuccessful, due principally to a lack of control of the temperature and rate of flow of the slag from the smelting furnaces.

Some of the other disadvantages encountered in the production of mineral wool by the processes mentioned above have been the high cost of production and the difficulty of securing a uniform product. Not only is the cost of production high, because the rock has to be quarried or the slag collected, the material transported to the mineral wool plant and relatively expensive fuel (usually coke) purchased to melt the charge, but also, since practically the only method of controlling the temperature, viscosity, and chemical content of the molten material is by changing the ratio of rock or slag to the coke charged in the cupola or by varying the amount of material added to the charge, the control of the molten material and the mineral wool formed therefrom is very far from being either instantaneous or automatic, since in most plants it is a matter of hours before the materials charged in at the top of the cupola can influence the temperature or composition of the molten material coming from the tap hole.

One feature of this invention is the provision of new and improved means by which the temperature, and more particularly the viscosity, of the molten stream of material from which the wool is formed can be maintained continuously at the most advantageous point for the formation of the wool. A further feature of my invention having to do with the manufacture of mineral wool from a fused raw material is the maintenance of the desired temperature and viscosity of the molten coal ash slag up to the point where the molten slag is delivered to the wool forming means, thereby insuring the production of mineral wool of uniform quality and character.

In this connection it should be mentioned that, as a part of the present invention, I make use of "wet-bottom" or "slag-tap" boilers or furnaces which have been developed within the last few years and are particularly adapted to use pulverized coal. In boilers of this type the temperature is kept high enough so that the ash of the coal collects on the floor of the boiler in a molten condition and can be drawn or tapped off at will, either continuously or at intervals as may be desired. Ordinarily, the pulverized coal is blown into the furnace, this method of firing being particularly advantageous with coals having a low fusion point ash, such low fusion point frequently being due to the presence of iron oxide in the ash, the iron oxide being originally present in the coal, largely as iron disulfide or pyrites ($FeS_2$). Therefore, according to the present invention, I make use of the molten slag or ash from furnaces of this type, in which the slag or ash is relatively high in iron oxides, in the production of an improved mineral wool.

An additional object of the present invention is the provision of a small furnace or container so constructed and arranged to receive the molten ash from the boiler plant, which may or may not be a "wet-bottom" furnace or the like, and to control the temperature and viscosity of the molten material so as to facilitate the subsequent formation of the same into mineral wool. Such small or intermediate furnace, which may be termed a conditioning furnace, may be heated in any suitable manner, either by fuel or electricity—preferably the latter. According to the principles of the present invention, heat is generated in the molten ash by passing an electric current through it, whereby the molten ash itself acts as the resistance in the circuit transforming the electric current into heat. By virtue of a conditioning furnace, the proper viscosity of the molten material may be maintained at all times for producing the best quality of wool.

Another feature of my invention is the maintenance of the desired viscosity by generating heat in the molten ash by passing an electric current through it, whereby the molten ash itself acts as the resistance in the circuit transforming the electric current into heat and maintaining substantially constant viscosity by maintaining the resistance of the molten slag substantially constant. This is possible due to the fact that the viscosity of a molten oxide mass or mixture is directly related to its electrical resistivity.

It is recognized that the viscosity of the slag at the time the wool is formed is one of the most important variables determining the quality of the mineral wool, and thus by virtue of the present invention, which contemplates keeping the viscosity of the molten ash constant, variations in the chemical composition of the molten material which ordinarily would affect the quality of the wool are rendered substantially harmless.

Another feature of this invention is the provision of a conditioning furnace for maintaining molten coal ash slag at the desired temperature and viscosity point, and which is especially adapted for use with spinning disks instead of the more conventional steam jet apparatus for forming mineral wool from the molten slag.

Another feature of this invention includes improvements in the electrodes of the conditioning furnace, whereby the maintenance of constant viscosity is facilitated.

These and other objects and advantages of the present invention will be apparent to those skilled in the art after a consideration of the following detailed description.

Figure 1:
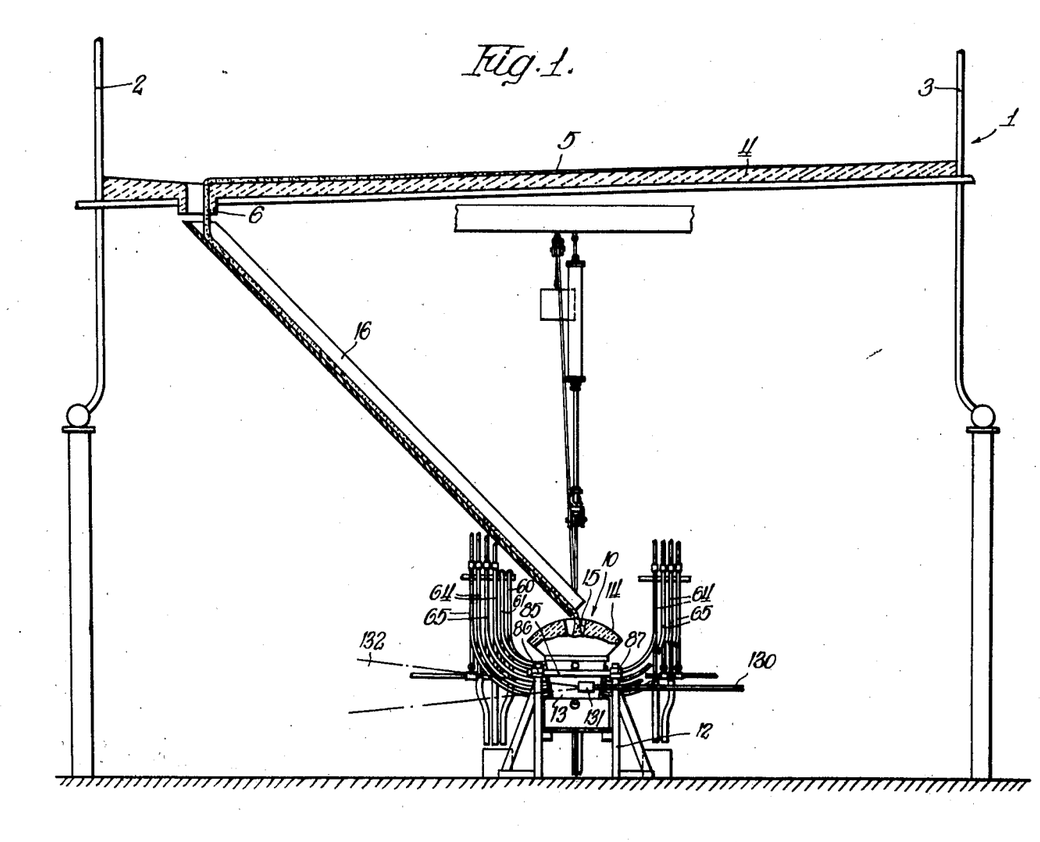
Figure 1 is a view showing a portion of the floor of a wet-bottom coal fired furnace and a portion of a conditioning or intermediate furnace receiving the molten slag or ash from the wet-bottom furnace.
Figure 2:
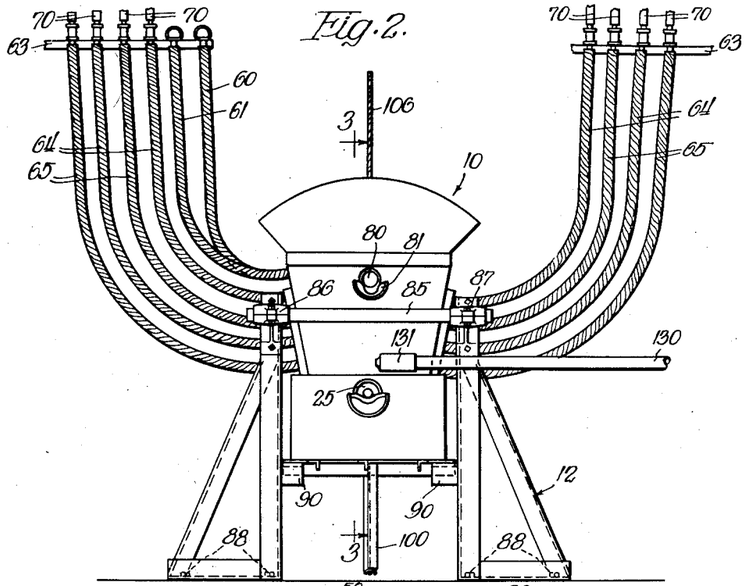
Figure 2 is a larger view of the intermediate or conditioning furnace.

Referring now more particularly to Figure 1, the coal fired boiler which the present invention makes use of is indicated in its entirety by the reference numeral 1 and includes more or less conventional water tubes 2 and 3 and a floor 4 upon which the slag or ashes from the combustion of the pulverized coal collect in molten state, as indicated at 5. Such boilers or furnaces are provided with a slag hole 6, either in the bottom or side, through which the molten ash flows, more or less continuously.

Boiler furnaces operate ordinarily at different rates at different times of the day, and it is not practically possible in the operation of a boiler plant to operate the boilers under entirely constant conditions, due to fluctuations in the demand for steam. Hence it would be very difficult to make a uniform quality of mineral wool from the molten ash just as it is tapped directly from the boiler. I therefore tap it more or less continuously into a small intermediate furnace or vessel of which I can control the temperature, so that the bath of slag in this intermediate or conditioning furnace is maintained at all times at the proper viscosity for producing the best wool.

The intermediate or conditioning furnace is indicated in its entirety by the reference numeral 10 and includes suitable framework 12 carrying a refractory container 13, which will be referred to in detail later, having a roof 14 in which a pouring opening 15 is placed. A trough 16 or the like may be arranged for conducting a flow of molten ash from the furnace 1 to the inlet opening 15 of the conditioning furnace 10. If desired, there may be several conditioning furnaces 10 for each principal boiler furnace 1 so that by shifting the trough or other suitable means from one conditioning furnace to the other the continuous flow of molten coal ashes 5 may be accommodated.

Figure 3:
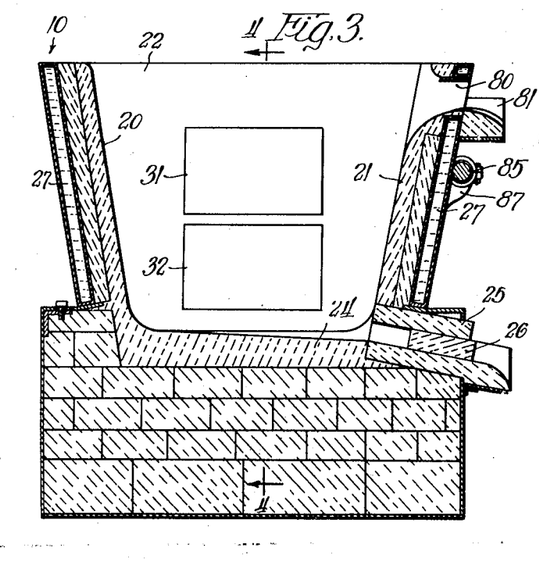
Figure 3 is a section taken substantially along the line 3—3 of Figure 2.
Figure 4:
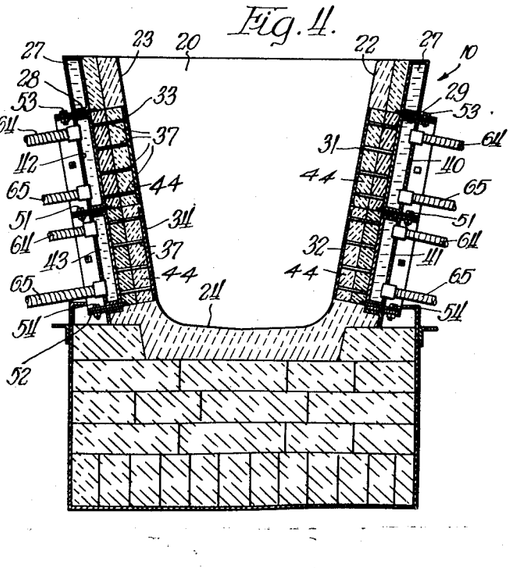
Figure 4 is a section taken substantially along the line 4—4 of Figure 3 and showing the insulated cooling water jackets and the electrically and thermally connected contact plates associated with the insulated cooling jackets.
Figure 5:
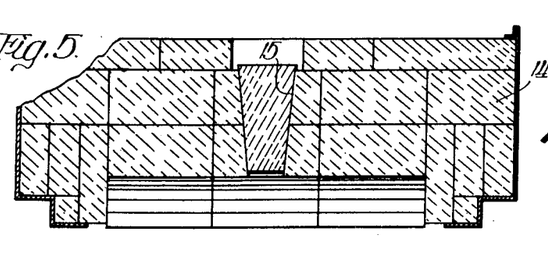
Figures 5 and 6 are longitudinal and transverse sections taken through the roof of the conditioning furnace shown in Figure 2.
Figure 6:
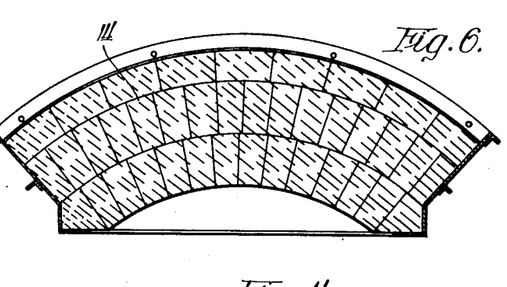

Turning now to Figures 2 to 6, which best illustrate the details of one form of conditioning furnace which has been found to be successful in carrying out the principles of the present invention, the furnace 10 consists of end walls 20 and 21 and side walls 22 and 23, and a bottom wall 24 sloping downwardly toward a tap hole 25. The bottom, side and end walls are formed of refractory material, commonly employed where high temperatures are encountered. The conditioning furnace may be heated in any suitable manner, either by fuel or electricity, but in order to keep it as small as possible, I prefer to use electricity. Heat is generated in the slag by passing an electric current through it, whereby the slag itself acts as the resistance in the circuit transforming the current into heat. Since any slag containing appreciable quantities of iron oxide has an extremely corrosive action on all known refractories, the side and end walls 20, 21, and 22, 23 are water jacketed so as to prevent overheating. The bottom 24 is not water jacketed but is more heavily lined with refractory brick or similar material, due to the possible danger of the formation and collection of molten iron in the furnace. When iron does collect, the plug 26 (Figure 3) may be removed and the molten iron drawn off through the slag tap 25. The roof 14 of the furnace is also formed of refractory material, such as fire brick or the like, and is provided with the inlet or receiving opening 15, as best shown in Figures 1 and 5. It may be water jacketed if necessary. The water jacketing of the sides and ends of the furnace may be accomplished in any known manner, such as a jacket 27 adapted to contain water or other cooling medium and surrounding the ends and sides, with openings 28 and 29 for the jacketed electrodes, to be referred to later.

According to the present invention, plate electrodes 31, 32 and 33, 34 are disposed on opposite side walls 22 and 23 of the furnace on the inside thereof and in the openings 28 and 29 in the furnace jacket 27. These plate electrodes are insulated from each other and are provided with conducting bars 37 (Figure 7) which connect the plate electrodes both thermally and electrically with the water jacket inserts indicated at 40, 41 and 42, 43. Refractory material is disposed between the plates 31, 32, 33 and 34 and the jackets 40, 41, 42 and 43, respectively, and the mass of refractory 44 relative to the mass of conducting bars 37 is so proportioned that the desired rate of heat transfer between the cooling jacket and the electrode plate is secured, as will be explained more in detail below.

Figure 7:
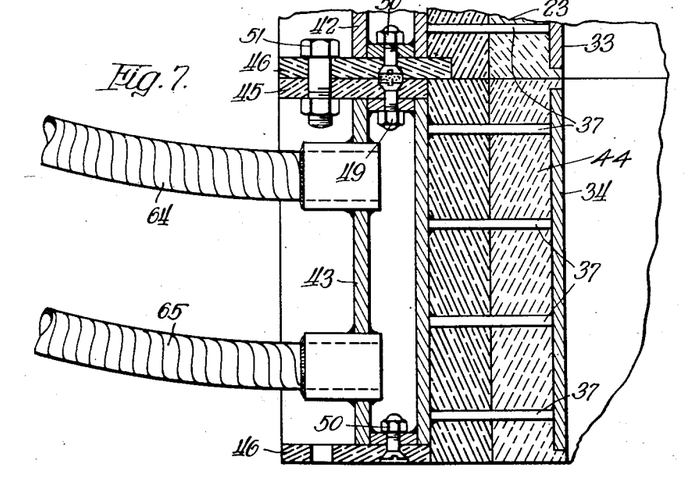
Figure 7 is an enlarged section taken vertically through one of the insulated cooling jackets.

The water jacket inserts are electrically insulated with respect to the other portions of the cooling jacket system, as best indicated in Figure 7. In this figure the water jacket inserts 42 and 43 have insulating strips 45 and 46 secured to the upper and lower edges by bolts 49 and 50, and the two water jacket inserts at one side of the furnace, thus insulated from one another, are bolted together as at 51 and to the upper water jacket 27 and a lower attaching plate 52 by bolts 53 and 54 (Figure 4). It is to be noticed that the conductor bars 37 connecting the contact plates with the insulated water jacket inserts pass through the refractory material making up the side of the furnace. The bars 37 are so proportioned as to conduct heat from the contactor plate to the water jacket at a predetermined rate sufficient to maintain the contact plates 31, 32 and 33, 34 at a temperature low enough to prevent destruction by the molten material in the furnace. In other words, to maintain the electrodes within the desired temperature limits, depending on the viscosity required, the refractory material resists to a certain extent the flow of heat from the plates 31, 32, 33 and 34 to the associated water jackets, while the heat conducting bars 37 passing through the refractory material conduct a certain amount of heat from the inner plates to the outer water jackets.

In any water cooled electrode, as long as there is any water in it at all, the temperature does not vary to any great extent as compared with the temperature of the molten slag, and therefore, according to this invention, preferably I determine experimentally by trial in each instance the proper relative amounts and location of heat conducting metal and heat insulating refractory material which, combined, are interposed between the water cooling and the hot electrically conducting electrode surface or contact plate to lengthen the life of the latter but without chilling the molten slag to such a point that it becomes non-conducting, or becomes conducting only under arcing conditions over a small area instead of over substantially the whole surface of the plate.

Figure 8:
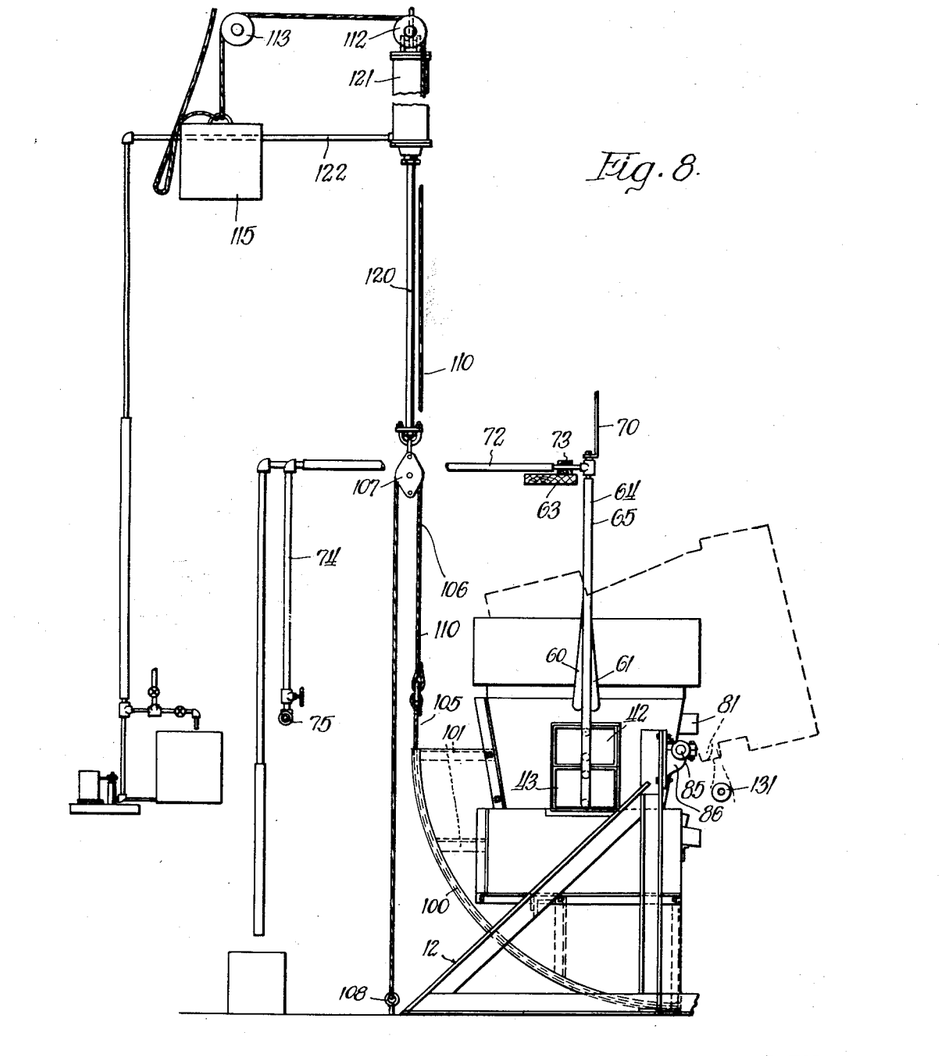
Figure 8 is a view illustrating one method of blowing the mineral wool by tilting the conditioning furnace about an axis substantially coincidental with the pouring spout of the furnace.

Cooling water is directed to and withdrawn from the furnace shell 27 by means of water connections 60 and 61 (Figure 2), the upper ends of these connections being supported in a suitable frame 63. Each of the insulated water jacket inserts 40, 41, 42 and 43 is provided with two flexible copper metal hose sections, indicated in Figures 2, 4, and 7 at 64 and 65. These sections serve not only to supply water to each of the water jacket inserts but also to conduct the required electrical current to or from the water jacket inserts. A frame 63 is provided at each side of the furnace 10 and supports the upper ends of the flexible copper metal hose sections 64 and 65. Bus bars 70 (Figure 2) are electrically connected with the copper hose sections adjacent the points where the latter are supported on the frames 63, and at the same point suitable water pipes 72 (Figure 8) are connected through supporting and insulating sleeves 73 carried on the frame 63. The water supply connections include pipes 74 leading to a supply main 75. Obviously, of course, other forms of supply, both as to cooling water and electrical current, may be employed where desired. Also, while I have shown only two jacketed electrodes on opposite side walls for purposes of illustration, a greater number is preferably used. Since the cooling water carries away a great deal of heat, which reduces the thermal efficiency of the furnace, I prefer to make the furnace small, so that the water cooled surfaces would also be small, and arrange to supply a relatively large amount of power for such a small sized furnace, so that the percentage of the total energy input that is lost in the cooling water will be as small as possible. One embodiment of the furnace which I have just described has a capacity of about 700 to 800 pounds of molten material, can take up to 100 kilowatts of electrical power input, and has a loss when operating between 2400 to 2600° F. of about 25 kilowatts in the water cooling. Losses other than in the cooling water do not amount to more than two or three kilowatts.

The furnace 10 is mounted for tilting movement on the frame 12 so that the furnace may be tilted for discharging its load of molten coal ash. As best shown in Figure 3, the end wall 21 of the furnace 10 is provided with a pouring hole 80 provided with a spout 81, and as best indicated in Figures 1 and 3 the furnace includes a trunnion shaft 85 which is mounted in bearings 86 and 87 forming a part of the supporting framework 12. The shaft 85 passes close to the pouring spout 81, and as indicated in Figure 3 the curvature of the lower wall of the pouring opening 80 and the adjacent portions of the spout 81 is substantially arcuate about the axis of the trunnion shaft 85. The frame or pedestal 12 is of more or less conventional construction, being built up of angle irons welded, or otherwise fastened together and secured to the floor by any suitable means, such as lag screws or expansion bolts 88. Clips 90 are welded or bolted to the framework 12 so as to support the furnace 10 in level position. The furnace itself carries a quadrant 100, best indicated in Figure 8, which is secured to the furnace shell in any suitable manner, such as by angle irons 101 or the like, and the quadrant 100 is preferably, but not necessarily, made up of a section of tubing split longitudinally and bent to the proper radius.

A tilting cable 105 is fastened at its lower end to the forward portion of quadrant 100 and at its upper end is connected to a cable 106 passing over a sheave 107 and extending downwardly to a fixed point 108. A counterbalancing cable 110 is also fastened to the flexible section 105 and passes over suitable pulleys 112 and 113 where the end of the cable 110 supports a counterweight 115. The sheave 107 is carried at the lower end of a plunger 120 which passes into a cylinder 121 which has suitable connections 122 to a source of fluid pressure. By suitable controls, pressure may be directed into the cylinder 121 to raise the plunger 120 and shift the furnace 10 from the position shown in Figure 8 in full lines to the position shown in dotted lines, tilting the furnace about the axis of the shaft 85. Molten material within the furnace 10 will therefore be poured out of the spout 81.

As best shown in Figure 1, a steam supply connection 130 leads to a blowing nozzle 131 disposed at one side of the stream issuing from the pouring nozzle 81. The rate of flow of the blowing fluid, such as steam under pressure, and the rate of tilting of the furnace are so controlled that the fluid pressure blows the entire molten stream laterally, as at 132, forming the product commercially known as mineral wool.

The bus bars 70 are connected in any suitable manner with a source of current and suitable controls serve to maintain a flow of current, providing that the furnace contains molten slag or coal ash, from one pair of contacts or plates to the other. It was mentioned above that the viscosity of a molten oxide bath is directly related to its electrical resistivity. By the use of suitable electrical controls, the resistance of the slag in the furnace may be maintained constant and by virtue thereof the viscosity of the mass of molten material in the furnace will also be maintained constant. This is an important feature of the present invention, for it is the viscosity of the slag at the time the slag encounters the blast from the blowing nozzle or other wool forming means that is one of the most important variables determining the quality of the mineral wool. The above mentioned controls are so arranged that if the resistance of the slag between the paths of contactor plates increases, an increase in power will immediately reduce the resistance, for the higher the temperature of any molten oxide bath, the lower its electrical resistance becomes. On the other hand, if the resistance across the two sets of contactor plates falls, a lowering of the power input will immediately permit the slag bath to cool off slightly so that both its resistance and viscosity will again increase.

One of the important advantages of using molten coal ashes, entirely aside from their availability as a by-product of no value at the present time, is that the mineral wool produced from coal ashes contains an appreciable percentage of iron oxides and is much softer than the ordinary commercial rock wool in which the basic constituent is composed practically wholly of the lighter metal oxides, as for example, calcium oxide and magnesium oxide. The molten material containing basic oxides in which the major portion is made up of iron oxides will best flow freely at about a temperature of 2400° F., and if blown at this temperature the best results are secured, the fibers being soft and flexible and have an average diameter, I have found, of from 2 to 6 microns, the average diameter usually being about 3 microns. The proportion between the acid and basic oxides of a mixture capable of being formed into a mineral wool will, of course, vary with the type of coal burned in the furnace and also to some extent upon the conditions under which the furnace operates. For example, by using a given coal with a given furnace, I produced mineral wool from boiler coal ash having approximately the following analysis:

|  | Per cent |
|---|---|
| Silica, $SiO_2$ | 39 |
| Alumina, $Al_2O_3$ | 15 |
| Lime, $CaO$ | 6 |
| Magnesia, $MgO$ | 1 |
| Iron oxides, $Fe_2O_3$ and $FeO$ | 37 |
| Other oxides | 2 |

In ordinary commercial rock wool, the iron oxide content amounts to not more than 2 or 3% by weight. I have also found that the mineral wool that I have produced by the above process scarcely ever contains as much as one tenth of 1% of sulphur. As a matter of fact, usually the sulphur content of the molten ash from the furnace rarely contains any more sulphur than the above amount, and even this small amount is not stable and is apparently oxidized and driven out in heating and blowing of the molten material. While it is true that many coals may contain up to 5% sulfur, and it would seem that the coal ash coming from the furnace might also contain appreciable quantities of sulphides, yet, however, this is not the case, for sulphides are stable only under reducing conditions and in basic slags, whereas a boiler furnace is a fuel oxidizing, not reducing, apparatus. For this reason, since practically all commercial coal ashes form acid, rather than basic slags, such small amounts of sulfur as may initially enter the slag are rapidly driven therefrom.

Thus, according to the present invention, I am enabled to take a waste by-product, that is, molten coal ashes which is not only of little or no value at the present time but is usually an item of expense on account of the need for disposal thereof, and convert this waste by-product into a highly useful and valuable by-product in the form of a mineral wool of uniform quality and superior characteristics, and at a cost far lower than any of the present methods for making a similar grade of mineral wool. Specifically, due to the use of a heat-controllable intermediate furnace for holding and conditioning the molten raw material placed between the melting furnace and the blowing nozzle, I am able to control the uniformity of the product without any appreciable time lag and much more accurately and continuously than it has been possible to do in the previous state of the art.

Figures 9 to 15 illustrate a modified form of electric furnace embodying certain improvements over the furnace shown and described above.

Figure 9:
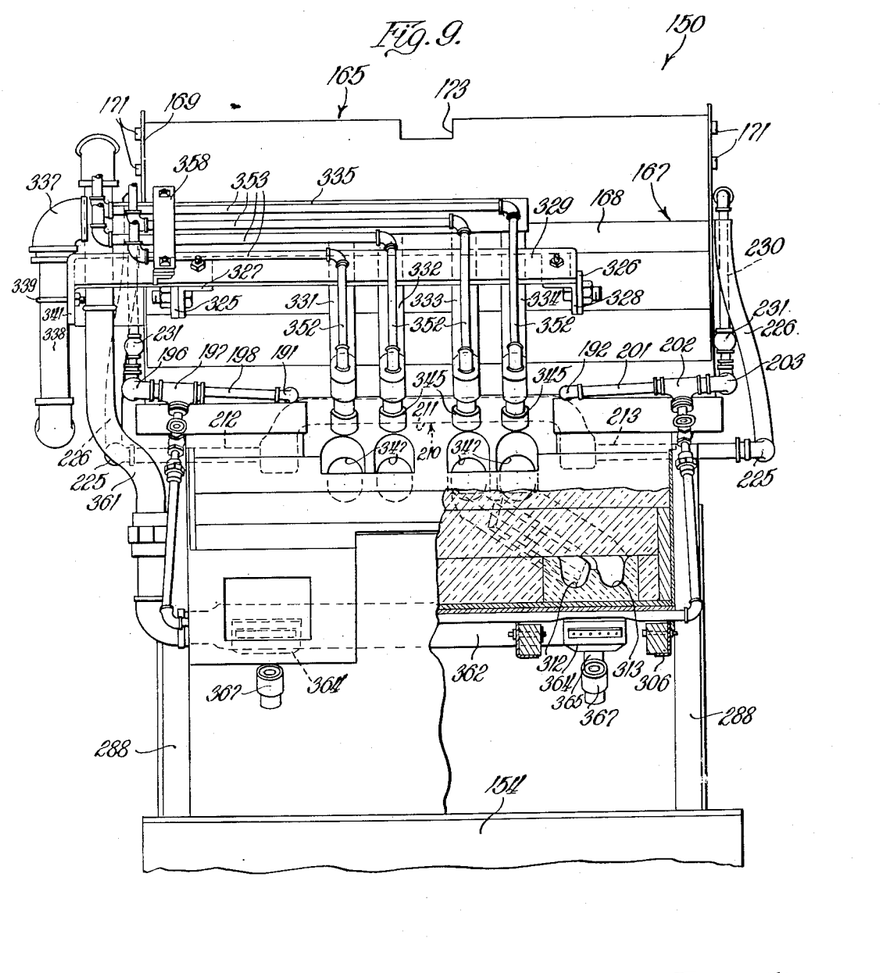
Figure 9 is a side view of another form of slag conditioning furnace.
Figure 10:
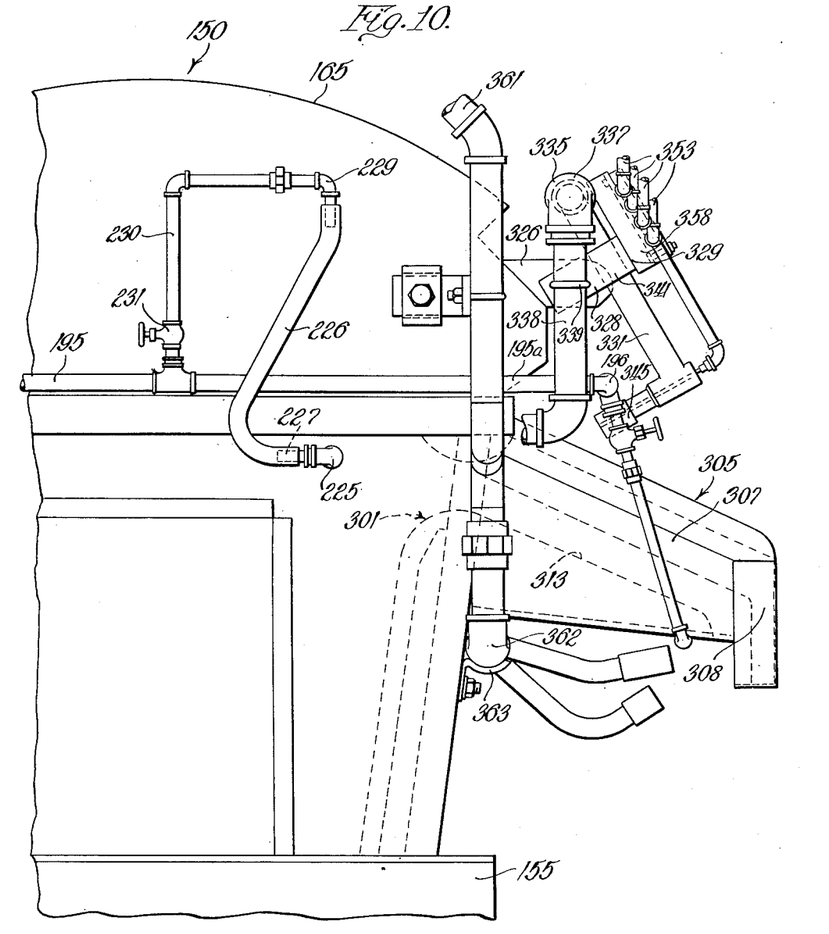
Figure 10 is an enlarged fragmentary end view of the furnace shown in Figure 9, showing certain details of the water, gas and air connections for the furnace of Figure 9.
Figure 11:
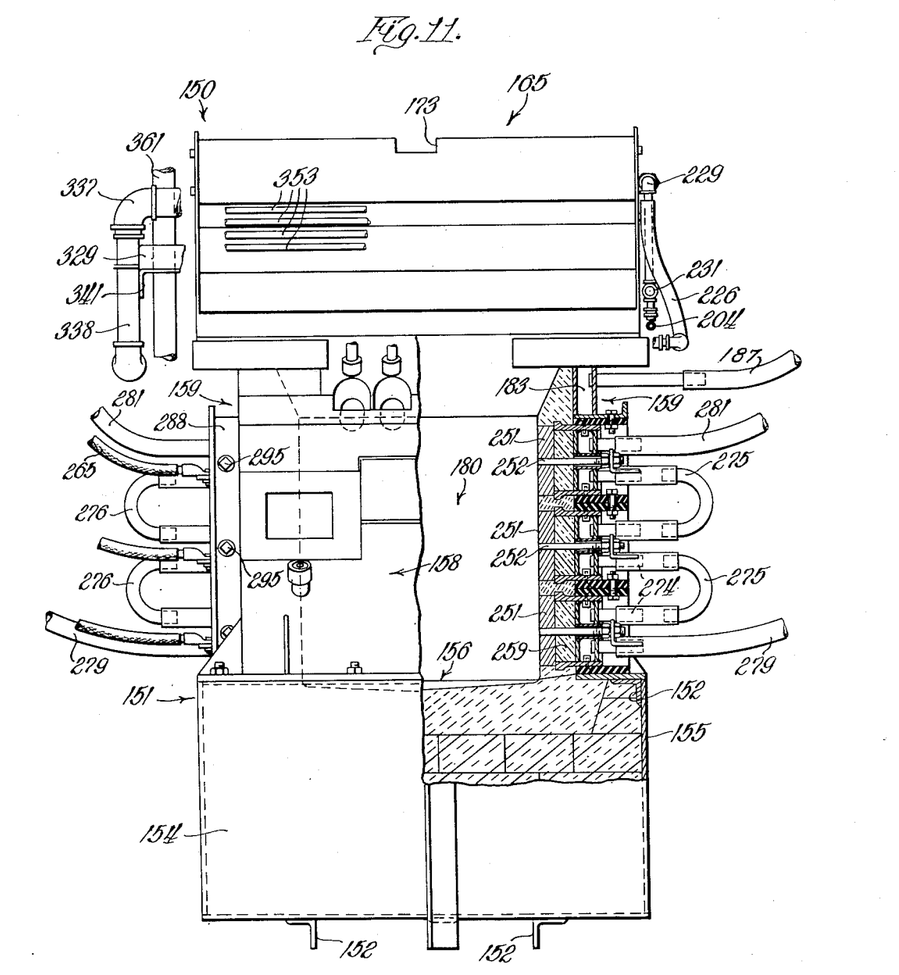
Figure 11 is a side view of the furnace of Figure 9, with parts broken away to show certain details of the water-cooled electrodes.
Figure 12:
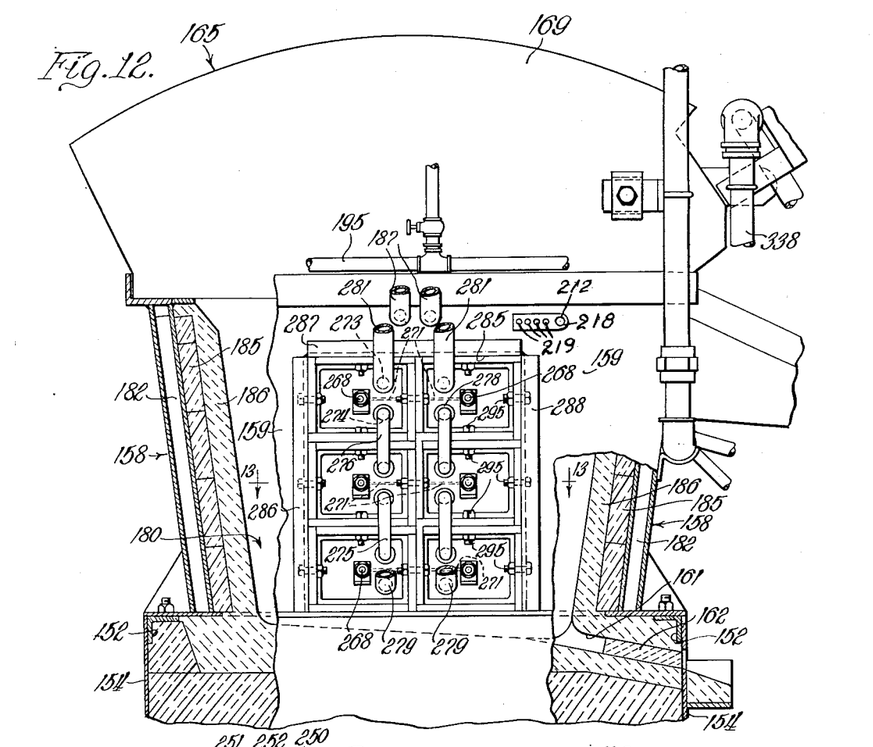
Figure 12 is an end view of the furnace showing the electrodes in elevation and parts of the furnace water jacket in section.

Referring now more particularly to Figures 9, 10 and 11, my second form of coal ash slag conditioning furnace is indicated in its entirety by the reference numeral 150 and comprises a suitable framework 151 (Figure 11) that includes horizontal and vertical angles 152 and 153 (Figure 15) and associated side and end plates 154 and 155, the latter enclosing the furnace bottom 156 which consists of suitable refractory blocks similar to the furnace bottom 24 described above. The sides and ends of the furnace proper are indicated at 158 and 159, respectively, the side walls 158 flaring upwardly, as best shown in Figure 12, while the end walls 159 are generally parallel and vertical. The bottom 156 of the furnace is concave and is provided with an outlet 161 through which any molten metallic iron may be withdrawn. Normally the outlet 161 is closed by a plug 162 as described above in connection with Figure 3.

The upper part or head of the furnace is indicated at 165 and comprises an arch 166 or roof formed of refractory brick or blocks and an enclosing sheet metal shell 167 having side and end plates 168 and 169 of the desired configuration. The end plates 169 of the furnace head or roof are preferably tied together by through bolts 171, and the furnace roof is provided with a single opening 173 through which the molten slag from the boiler flows into the interior of the conditioning furnace. The lower edges of the furnace roof or head 165 is defined by a pair of angles 176. The section of the furnace that receives the charge of molten slag is indicated at 180, and from Figures 11, 12 and 14, it will be seen that the side and end walls 158 and 159 of the furnace are provided with water jackets 182 and 183, respectively. Water is circulated through the water jackets 182 and 183 by inlet and outlet connections 187.

Figure 14:
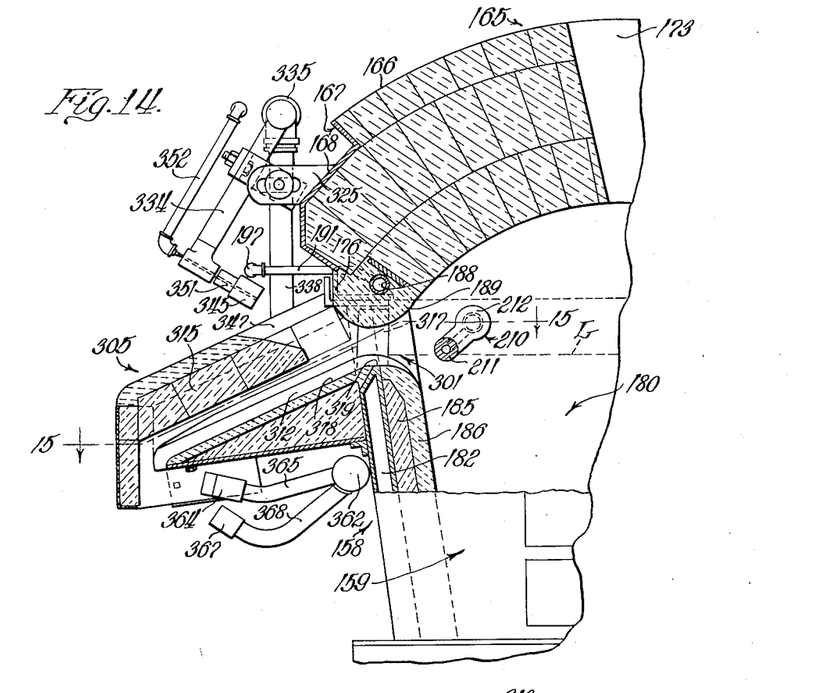
Figure 14 is a fragmentary end view, partly in section, of the furnace shown in Figure 9.

Interiorly of the water jackets 182 and 183 the side and end walls 158 and 159 consist of insulating brick 185, and interiorly of the brick 185 each wall has a layer of refractory material 186, preferably chrome ore or the like. The forward edge of the furnace roof is provided with a water conduit 188 set in suitable insulating material 189, such as chrome ore, and is connected at its ends within the insulating material 189 to short pipe sections 191 and 192 (Figures 9 and 14). The conduit 188 does not extend the entire length of the roof but only adjacent and just beyond the pouring spout which will be described later.

The cooling water is supplied through a pipe 195 (Figure 10), the forward end 195a of which is connected by an elbow 196 to a coupling 197 which is connected by a short pipe 198 to the section 191 (Figure 9). Cooling water which enters through the supply 195 passes through the sections 198 and 191 and through the conduit 188, to the other section 192. From this point the water passes through a short pipe 201, a coupling 202, and an elbow 203 to a discharge pipe 204 (Figure 11) which occupies approximately the same position at the right hand end (Figures 9 and 11) of the furnace that the pipe 195 occupies at the left end of the furnace (Figures 9 and 10).

The normal slag level is indicated in Figure 14 by the reference character L, and pivotally mounted above this point is a water cooled tubular slag skimmer, indicated in its entirety by the reference numeral 210, the purpose of which is to prevent chunks or pieces of frozen slag from moving into the slag spout. As best shown in Figure 9, the slag skimmer 210 is of generally U-shaped configuration, having an intermediate section 211 and end or trunnion sections 212 and 213 journaled in suitable bearings 214 (Figure 15) in the form of a fibre tube 214a disposed within a sleeve or pipe section 215 welded to the side walls of the water jacket 183. Loosely packed asbestos rope 216 is disposed about the inner end of the tube 213 to protect the bearing from the heat and corrosive action of the molten slag, and the fibre tube 214a serves to insulate the slag skimmer 210, which is in contact with the slag through which current is flowing, from the end walls 159 of the furnace. The bearing construction for the other end of the slag skimmer is identical with that just described, so that a further description is unnecessary. Each end of the trunnion sections 212 and 213 is threaded, as at 217, and carries a counterweight arm 218 fixed thereto in any suitable manner. Each arm is provided with a plurality of holes 219 (Figure 12) to receive counterweights.

The slag skimmer is generally of tubular construction and the trunnions 212 and 213 are similar, thereby providing for a flow of cooling fluid through the slag skimmer. An elbow 225 is secured to the outer threaded end 217 of each of the skimmer trunnions 212 and 213, as best shown in Figures 9 and 10. A flexible hose 226 is connected to a fitting 227 that is carried by the elbow 225, the other end of the flexible hose 226 being connected to an elbow 229 which forms a part of a conduit 230. The latter is connected by a valve 231 to the water supply pipe 195 (Figure 10) at the left end of the furnace (Figure 9). The flexible tube 226 and associated pipe 230 at the right hand end (Figure 9) of the furnace are connected by the associated valve 231 to the discharge pipe 204. Thus, by opening both of the valves 231 a flow of cooling water is directed through the slag skimmer, the flexible hose sections 226 accommodating swinging movement of the slag skimmer in response to changes in liquid level in the furnace. The flexible tubes 226 are preferably made of rubber or other suitable material so as to electrically insulate the water pipes from the slag skimmer.

In the type of furnace shown in Figure 4 and described above, the electrodes by which current is passed through the mass of molten slag in the furnace for the purpose of maintaining its viscosity constant at the desired value are arranged in diverging relationship, the upper electrodes being further apart than the lower electrodes, as will be clear from Figure 4. This results in a construction in which the path of the current between the upper electrodes is longer than the path between the lower electrodes. According to the form of invention shown in Figures 9 to 14, the current paths between the pairs of electrodes are all of the same length, due to the fact that the electrodes are arranged in vertical parallel planes, as best shown in Figure 11. Also, the form of electrode shown in the latter figure is simplified in certain respects as compared with the electrodes shown in Figures 4 and 7.

Figure 13:
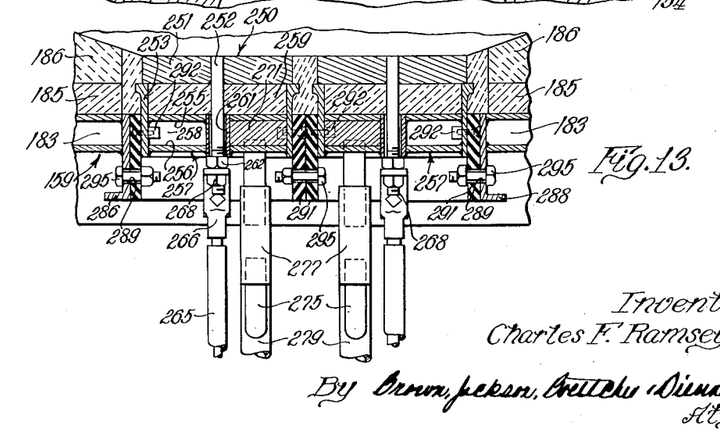
Figure 13 is an enlarged section taken along the line 13—13 of Figure 12.

Referring now more particularly to Figures 11, 12 and 13, it will be noted that there are six electrodes at each end of the furnace and that the electrodes are arranged in three right- and left-hand pairs. As best shown in Figure 13, each electrode, indicated by the reference numeral 250, consists of an inner metallic contact plate 251 to the central portion of which a conducting bar 252 is firmly secured, as by welding or the like. The plates 251 may be made of any suitable material but preferably they are made of wrought iron. A rectangular shell 253 is in generally marginal registration with the contact plate 251 and is provided with inner and outer walls 255 and 256, which are spaced apart to form a water jacket 257 having a water chamber 258. Between the inner wall 255 of the water jacket 257 and the contact plate 251 is a mass of heat insulating material 259, preferably in the form of heat insulating brick. The conducting bar 252 extends outwardly from the contact plate 251 through an opening formed by a sleeve 261 welded in openings in the central portions of the plates 255 and 256. The outer end of the bar 252 is threaded and receives an attaching nut 262 by which the electrode parts are held together. A current-carrying cable 265 is provided with a terminal 266 which is bolted, as at 268, to the outer end of the bar 252. A short intermediate wall 271 is secured to the water jacket walls 255 and 256 in any suitable manner, as by welding, the ends being attached to or disposed closely against the sleeve 261 and the opposite edge of the electrode. By virtue of the short plate 271, the water chamber included in each of the electrodes is generally U-shaped in configuration.

A pair of short bushings 273 and 274 extend through suitable openings in the outer electrode plate 256 and extending into the water space on opposite sides of the wall 271, thus communicating with the legs of the U-shaped water chamber. A pair of return bends 275 and 276 and associated sleeves 277 and 278 are provided, the lower return bend 275 connecting the upper bushing 273 of the lower electrode to the lower bushing 274 of the intermediate electrode. Similarly, the return bend 276 connects the upper bushing 273 of the intermediate electrode to the lower bushing 274 of the upper electrode. In the lower electrode, the lower bushing 274 is connected by a pipe or hose 279 to a suitable water supply. Water enters through the lower bushing 274 of the lower unit, passes around the U-shaped passage therein, through the return bend 275, and again through the U-shaped passage of the intermediate electrode. The upper bushing 273 of the upper electrode is connected to a suitable outlet or discharge pipe 281. Thus, water flowing in through the intake 279 passes from one electrode to another in serial arrangement and in a generally sinusoidal path.

The direct contact of the plate 251 with the periphery of the shell 253 and the connection of the plate 251 with the water jacket 257 through the bar 252 provide for such an amount of heat transference from the cooling water chamber to the contact plate that the latter is not overheated, but at the same time the insulation 258 prevents too rapid heat transference, so that the slag adjacent the contact plate does not become chilled and frozen. If the slag at the contact plate 251 freezes, then the mass of slag acts as an insulator and prevents the proper flow of current.

The three pairs of electrodes at each end of the furnace are mounted in an opening 285 defined by three angle bars 286, 287 and 288 in the furnace end. The insulation 259 is placed not only between each of the contact plates 251 and the associated water jacket 257, but also between the inner portions of the shells 253 and the insulation 185 and 186 around the opening 285. As best shown in Figure 13, the angle bars 286, 287 and 288, which define a wall of the water jacket 183, extend outwardly of the opening 285 and are provided with bolt receiving apertures 289. Each of the electrode units carries four strips 291 of insulating material which is secured thereto by countersunk bolts 292 so as to form a part thereof. The several insulating strips are bolted, as at 295, to the angles 286, 287 and 288, thereby securing the several electrode units in place. The electrode construction at the other end of the furnace is substantially the same, so that a further description is unnecessary.

The operation of the furnace so far described is substantially the same as the furnace shown in Figures 1 to 8. The molten coal ash slag from the boiler is directed into the furnace through the roof opening 173 and held in the furnace at the desired temperature and viscosity, under the control of suitable electrical control apparatus associated with the electrodes. Cooling water is directed through the furnace jacket by the pipes 187, and through the electrodes by the pipes 279 and 281. Current flowing from one set of electrodes at one end of the furnace to the electrodes at the other end, under suitable control, maintains the mass of molten slag at the desired temperature, the relation between the conducting bars 252 of the electrode and the insulating material 259 being such that the electrodes are kept cool enough to prevent corrosion and destruction but not so cool that there is any tendency for the slag to freeze and hence set up a mass of insulation interfering with the proper operation of the furnace.

The furnace shown in Figures 9 to 15 may be mounted for tilting movement about an axis in the same way as the furnace shown in Figures 1 to 8, or it may be mounted upon a suitable framework having curved trackways providing for the tilting movement of the furnace. Whatever the method of support, it is desirable to have the furnace tilt about an axis that passes through or as closely adjacent as possible to the spout or other opening from which the molten slag is poured, and according to the present invention I provide means for maintaining the slag stream at the proper temperature as it emerges from the conditioning furnace, and to this end I have provided novel spout construction and novel heating means associated therewith, which will now be described.

Figure 15:
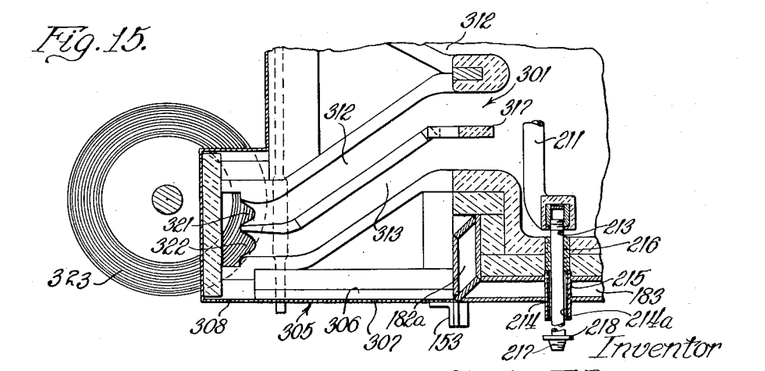
Figure 15 is a section taken along the line 15—15 of Figure 14, showing the dual slag spouts and their relation to the associated spinning disc.

Referring now more particularly to Figures 9, 10, 14 and 15, one side wall of the furnace is provided with a spout opening or tap hole 301 (Figure 14) underneath the water pipe section 188 in the furnace roof, as described above. Around the tap hole 301 is mounted a spout frame 305 which consists of suitable angle bars 306 and an enclosing shell 307, preferably made of sheet metal or the like. The shell 307 includes a pair of end boxes 308 formed of stainless steel or the like. The spout frame and shell enclose two pairs of spout channels 312 and 313 formed in suitable refractory material contained within and supported by the spout frame. Each pair of channels 312 and 313, as best shown in Figure 15, are arranged generally parallel but in diverging relation with respect to the corresponding channels of the other pair. The channels are covered by refractory brick 315 or other insulating material, and at their upper ends the channels 312 and 313 are divided by a block of Carborundum tile 317 set on a steel block 318 adjacent and above the slag level L and embedded in suitable refractory material, such as chrome ore. At this point it will be noted that the upper edge of the water jacket 182 defines a knife edge 319 over which the slag passes when the furnace is poured. The outlet ends of the channels 312 and 313 are directed downwardly, as at 321 and 322, being enclosed by the end box 308 at this point. The molten slag is thus divided into four divergent streams from the tap hole 301 and directed onto a pair of spinning discs 323 in the manner disclosed and claimed in my copending application filed August 13, 1938, Serial No. 224,830. For convenience of illustration in the present instance, only one pair of channels and one spinning disc are shown.

In order to maintain the slag stream at the desired temperature as it leaves the tap hole 301 and is discharged onto the spinning discs, I provide suitable heating means, preferably in the form of gas burners or the like mounted directly on the furnace adjacent the tap hole 301. To this end, suitable brackets 325 and 326 (Figure 9) are mounted on the furnace roof and support clips 327 and 328 on which a bar 329 is carried. The bar 329 serves to support four gas conduits 331, 332, 333 and 334 which communicate with a manifold 335. The manifold 335 is closed beyond the conduit 334 and at the other end communicates with an elbow 337 which is carried at the upper end of a gas supply pipe 338, the latter being supported by a U-bolt 339 which is fastened to the downwardly turned end 341 of the supporting bar 329.

Each of the gas conduit sections 331 to 334 carries a nozzle 345 at the lower end. The nozzles 345 are disposed above corresponding openings 347 formed in the insulating covering 315 over the channels 312 and 313 and are so set as to direct the gas flame substantially to the knife edge section of the spout over which the molten slag flows.

Each of the nozzles 345 includes an air tube 351 which receives compressed air from an associated air pipe 352 supported above the conduits that feed gas to the nozzles. Each of the air pipes 352 is connected at its upper end by an elbow to an associated air line 353, the air lines 353 being supported by a suitable bracket 358 bolted to the supporting bar 329 individually controlled by suitable valves (not shown). It will be noted that the air nozzles are directed toward the slag streams. The effect of each of these several air blasts is to retard the flow of the associated slag stream, both by mechanically opposing the flow and also by lowering the temperature of the gas flame and the slag, making the latter more viscous and decreasing its flow. Thus, by governing the amount of air which passes through the various nozzles, the flow through the several slag channels 312 and 313 can be controlled easily and accurately, so as to have the quantity of slag delivered to the spinning discs by all of the slag streams substantially the same.

Another gas conduit 361 leads downwardly (Figure 10) to a manifold 362 supported by a bracket 363 across the side of the furnace underneath the spout frame 305, as best shown in Figures 9, 10 and 14. To the gas manifold 362 are attached a pair of laterally elongated gas nozzles 364 connected to the gas main by a pipe section 365. The gas manifold 362 also has a pair of individual nozzles 367 underneath the elongated nozzles 364, the nozzles 367 being connected by sections 368 to the gas main 362. The lower nozzles 364 and 367 are set so as to direct the flame at the point where the slag stream leaves the exit ends of the channels 312 and 313.

From the above description it will be seen that the furnace shown in Figures 8 to 14 is constructed so that the molten slag, as it is poured from the furnace, is divided into four streams in diverging relation and discharged onto a pair of spinning discs while under exact temperature control, due not only to the controlled flow of current from one set of electrodes to the other but also due to the application of the desired or required amount of heat to the slag stream both before and after it is divided.

The electric furnace construction described above includes or is provided with means for receiving the molten slag as it flows from the boiler and, while maintaining the boiler slag at the proper temperature, the runner delivers the slag at the proper or desired temperature into the conditioning furnace.

From the above it will be apparent that I have provided a furnace construction particularly adapted for handling molten coal ash slag and arranged to receive the molten slag from a furnace and to maintain the slag at all times in the proper condition for forming mineral wool. Obviously, my invention is not to be limited to the particular details shown and described, as widely different means may be employed in the practice of the broader aspects of my invention.

What I claim, therefore, and desire to secure by Letters Patent is:

1. A furnace for maintaining a mass of non-metallic material in the molten state, comprising a container having walls of refractory material, a pair of contactor plates disposed against the inner surface of opposite side walls, a cooling water jacket disposed on the outside of each of said side walls, refractory material having low heat conductivity disposed between said jackets and said plates, and heat conducting bars connected electrically with said plates and said jackets.

2. A furnace for maintaining a mass of non-metallic material in the molten state comprising a container having walls of refractory material, a pair of contactor plates disposed against the inner surface of opposite side walls, a cooling water jacket disposed on the outside of each of said side walls and electrically insulated from one another, and heat conducting bars connecting each of said plates with the associated water jacket, the bars being formed to secure a predetermined rate of heat transfer between said plates and cooling jackets.

3. In an electric furnace, an electrode comprising a contact plate, cooling means spaced therefrom, refractory insulating material disposed between said cooling means and said plate, and heat conducting means connecting said cooling means and said plate to secure the desired rate of heat transfer therebetween.

4. In an electric furnace an electrode comprising a contact plate, cooling means spaced therefrom, refractory insulating material disposed between said cooling means and said plate, heat conducting means connecting said cooling means and said plate to secure the desired rate of heat transfer therebetween, and current conducting means connected to said cooling means, said heat conducting means serving also to carry current from said cooling means to said contact plate.

5. In an electric furnace, a composite water cooled electrode comprising a contact plate, a water chamber, and two masses of material between said plate and chamber, one being conducting material and the other an insulating material, and proportioned with respect to each other that neither the plate is overheated nor the molten material frozen at the electrode.

6. A furnace for maintaining a mass of non-metallic material in the molten state comprising a container having walls of refractory material, a pair of electrodes on the inner surface of opposite side walls of said container, insulated water jackets on the exterior thereof, a current carrying cable connected to each of said water jackets, and conducting bars joining each of said electrodes with the associated water jacket, so as to carry current to said electrode.

7. In an electric furnace, a water cooled electrode comprising means forming a water chamber, inlet and outlet conduit means associated therewith, a contact plate spaced from said water chamber, means establishing a limited amount of thermal and electrical conductivity between said plate and chamber, heat insulating material surrounding said last mentioned means, and attaching means for said water chamber in the form of dielectric members secured to said chamber.

8. In an electric furnace, a composite water cooled electrode comprising a contact plate, a water chamber spaced from and paralleling said contact plate, and two masses of material in the space between said contact plate and water chamber and each interconnecting the same, one being a relatively good electrically and thermally conducting material and the other being a relatively poor electrically and thermally conducting material.

CHARLES F. RAMSEYER.